(12) United States Patent
Pettersson et al.

(10) Patent No.: US 10,173,274 B2
(45) Date of Patent: Jan. 8, 2019

(54) TOOL FOR CHIP REMOVING MACHINING AND A CUTTING INSERT

(71) Applicant: SANDVIK INTELECTUAL PROPERTY AB, Sandviken (SE)

(72) Inventors: Sven Pettersson, Valbo (SE); Lennart Wihlborg, Ockelbo (SE); Isak Kakai, Gavle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 73 days.

(21) Appl. No.: 15/531,416

(22) PCT Filed: Nov. 9, 2015

(86) PCT No.: PCT/EP2015/076042
§ 371 (c)(1),
(2) Date: May 26, 2017

(87) PCT Pub. No.: WO2016/083107
PCT Pub. Date: Jun. 2, 2016

(65) Prior Publication Data
US 2017/0320145 A1 Nov. 9, 2017

(30) Foreign Application Priority Data

Nov. 28, 2014 (EP) .................... 14195443

(51) Int. Cl.
B23C 5/06 (2006.01)
B23C 5/22 (2006.01)
B23C 5/20 (2006.01)

(52) U.S. Cl.
CPC .............. B23C 5/22 (2013.01); B23C 5/06 (2013.01); B23C 5/207 (2013.01); B23C 5/2213 (2013.01);
(Continued)

(58) Field of Classification Search
CPC .......... B23C 2200/16; B23C 2200/161; B23C 2200/165; B23C 2200/0405; B23C 5/22;
(Continued)

(56) References Cited

U.S. PATENT DOCUMENTS 3,831,237 A 8/1974 Gunsalus
9,120,154 B2 * 9/2015 Hecht ................. B23B 27/1622
(Continued)

FOREIGN PATENT DOCUMENTS

EP 0037691 A2 10/1981
EP 2617505 A1 7/2013
EP 2682215 A2 1/2014

Primary Examiner — Will Fridie, Jr.
(74) Attorney, Agent, or Firm — Corinne R. Gorski

(57) ABSTRACT

A tool and a cutting insert for chip removing machining includes a tool body with an insert seat, a cutting insert mounted in the insert seat, and a fastening member. The cutting insert includes a first locking member extending in an area located outside of a central axis of the cutting insert. A second locking member configured to engage with the first locking member is provided in the insert seat. The fastening member extends through a through-hole and bears on a lower contact region of the cutting insert to press the cutting insert against a top support member provided rotationally ahead of the insert seat so that the second and first locking members lock with each other and form a radial support for the cutting insert, and on the other hand it presses an axial support region in the side surface of the cutting insert against an axial contact surface provided in the insert seat.

20 Claims, 9 Drawing Sheets

(52) U.S. Cl.
CPC .... *B23C 2200/0405* (2013.01); *B23C 2200/165* (2013.01); *B23C 2210/168* (2013.01)

(58) Field of Classification Search
CPC ..... B23C 5/2204; B23C 5/2403; B23C 5/207; B23B 2200/167; B23B 2200/168; B23B 2200/161; B23B 2200/165
See application file for complete search history.

(56) References Cited

U.S. PATENT DOCUMENTS

| | | | | |
|---|---|---|---|---|
| 9,475,135 | B2* | 10/2016 | Wandeback | B23F 21/128 |
| 9,849,523 | B2* | 12/2017 | Jiang | B23C 5/2226 |
| 2005/0135884 | A1* | 6/2005 | Lundvall | B23B 27/145 |
| | | | | 407/113 |
| 2006/0056928 | A1* | 3/2006 | Riviere | B23C 5/1045 |
| | | | | 407/113 |
| 2006/0216121 | A1* | 9/2006 | Edler | B23B 27/1611 |
| | | | | 407/104 |
| 2007/0160431 | A1* | 7/2007 | Pantzar | B23C 5/2213 |
| | | | | 407/67 |
| 2013/0294850 | A1* | 11/2013 | Park | B23C 5/06 |
| | | | | 407/47 |
| 2016/0067805 | A1* | 3/2016 | Nickel | B23C 5/207 |
| | | | | 407/25 |
| 2017/0326657 | A1* | 11/2017 | Pettersson | B23C 5/109 |

* cited by examiner

TOOL FOR CHIP REMOVING MACHINING AND A CUTTING INSERT

RELATED APPLICATION DATA

This application is a § 371 National Stage Application of PCT International Application No. PCT/EP2015/076042 filed Nov. 9, 2015 claiming priority of EP Application No. 14195443.8 filed Nov. 28, 2014.

TECHNICAL FIELD OF THE INVENTION

The present invention relates to a tool for chip removing machining according to the preamble of claim 1. It further relates to an indexable cutting insert for use in such a tool according to the preamble of claim 11.

BACKGROUND OF THE INVENTION AND PRIOR ART

Within the field of chip removing machining of metal, a continuous development aims at making the tools for chip removing machining more effective in order to be able to carry out the machining in a fast and accurate way. For cost-efficiency, it is preferable to use a cutting tool which comprises on one hand a tool body, and on the other hand detachable and replaceable cutting inserts. However, the cutting inserts are subjected to great forces during the machining operation, acting to displace and turn the cutting inserts. It is therefore necessary to rigidly fasten the cutting inserts in the tool body. This is most often done by providing the cutting insert with a centre hole, by means of which a screw or another male fastening member is used to fasten the cutting insert in the tool body. There are however disadvantages associated with this fastening method, in particular for cutting tools having a small diameter or having a large number of mounted cutting inserts. For example, the small diameter or the small distance between successive cutting inserts make it necessary to use small screws, which are generally difficult to handle and which are easy to drop in the process of mounting the cutting insert. For the operator, it is also time consuming to demount and mount all screws in a large diameter tool with many cutting inserts. It may also be difficult to access the hole in the mounting process. Furthermore, the centre hole weakens the cutting insert and makes it less shape stable. In a manufacturing process using sintering to produce the cutting inserts, the large centre hole makes the pressed powder density uneven and may cause shape defects upon sintering.

US20070160431 discloses a tool and a cutting insert for chip removing machining. An interface is provided between the cutting insert and the tool body, whereby forces can be transferred in two different directions (e.g. radially and axially) and the precision in the position of the active cutting edge is improved. The interface discloses elongate male-/female-like engagement means. The cutting insert is provided with a through-hole and is fastened to the tool body by means of a screw. Although, other fixing means are mentioned—such as clamps, lever mechanisms etc.—the known interface for positioning and fixing the cutting insert to the tool body can be improved by facilitating the cutting insert replacement or indexing, in particular by saving a lot of trouble and time in the replacement or indexing procedure for tools with small diameters, where small fastening members are needed or difficult to fit, as well as for tools with large diameters and many cutting inserts.

SUMMARY OF THE INVENTION

An object of the present invention is therefore to provide a tool for chip removing machining, in which removable cutting inserts may be easily and efficiently secured at a precise position without compromising stability. Another object is to provide a cutting insert suitable for use in such a tool, which cutting insert is indexable and can be securely mounted in the tool.

This object is, according to a first aspect of the invention, achieved by a tool according to claim 1. The tool comprises a tool body including a front end and a rear end, between which a central rotation axis extends around which the tool is rotatable in a direction of rotation, and at least one insert seat provided in a transition between the front end and a peripheral surface extending between the front end and the rear end of the tool body, a chip pocket being provided rotationally ahead of the at least one insert seat. It further comprises at least one cutting insert securely mounted in the at least one insert seat. The cutting insert comprises an upper side and a lower side, wherein the upper side includes a chip surface and wherein a central axis extends between the upper side and the lower side, a side surface extending between the upper side and the lower side around the periphery of the cutting insert and including at least one clearance surface, and a cutting edge formed between the at least one clearance surface and the chip surface and having an active cutting edge portion defined to be located outside of the central axis of the cutting insert. The tool further comprises a fastening member. In its lower side, the cutting insert comprises at least one first locking member in the form of a locking groove or a locking ridge extending in an area located outside of the central axis of the cutting insert, and a second locking member configured to engage with the first locking member is provided in the insert seat.

The tool is characterized in that a top support member is provided rotationally ahead of the at least one insert seat and a through-hole having an orifice in the insert seat is provided rotationally behind the insert seat, the fastening member extending through the through-hole and bearing on a lower contact region provided on the lower side of the cutting insert, whereby the fastening member on one hand presses an upper contact region provided on the upper side of the cutting insert against the top support member of the tool body so that the second locking member locks with the first locking member and forms a radial support for the cutting insert, and on the other hand presses an axial support region provided in the side surface of the cutting insert against an axial contact surface provided in the insert seat.

In the tool according to the invention, the cutting inserts are thus mounted by means of a clamping mechanism. A separate fastening member such as a screw is extending through the tool body and the top support member and the second locking member are integrally formed with the tool body. Alternatively, the second locking member may be formed in a shim placed beneath the cutting insert. Since the fastening member does not extend through the cutting insert but only through the tool body, there is no need to completely remove the fastening member from the tool body when replacing or indexing the cutting insert. Instead, the fastening member can be slightly retracted with respect to the insert seat so that the cutting insert mounted therein may be removed and a new one may be mounted. This saves a lot of trouble and time in the cutting insert replacement or indexing procedure for tools with small diameters, where small fastening members are needed, as well as for tools with large diameters and many cutting inserts. For tools with large diameters and many cutting inserts, the clamping mechanism used in the tool according to the invention allows a larger number of cutting inserts in comparison with traditional screw-mounted cutting inserts. Furthermore, since the fastening member does not extend through the cutting insert, the cutting insert may be manufactured without through-hole or with a smaller through-hole (not intended for fastening the cutting insert, which is described below). Hence, it involves fewer shape defects resulting from the manufacturing (pressing and sintering) of the insert and it can be made thin without compromising strength, i.e. the distance between the upper side and the lower side can be made short. The manufacturing of cutting inserts involves pressing a powder into the shape (or so called green body) of the cutting insert. A problem with cutting inserts having through-holes for receiving a fastening member is that pressing can leave a variation in the density distribution around the through-hole and such unevenly compressed material causes the cutting inserts to deform after sintering. A cutting insert without the through-hole is on the other hand more uniformly compressed and thereby exhibits fewer shape defects after sintering. It should be mentioned however that the cutting insert may be provided with a small through-hole designed for supporting it in a subsequent coating process, such as a physical vapour deposition (PVD) process, yet such small through-holes will not affect the cutting insert in a detrimental way as mentioned above.

The cutting insert is mounted in the tool body by sliding it into its position behind the top support member, resting on the axial contact surface. Thereafter, the fastening member is used to secure the cutting insert in this position. The mounting procedure is simple but still, the cutting insert can be very accurately positioned. When the tool is used in a machining process, the cutting forces relieve the fastening member by pressing the first locking member toward the second locking member and thereby keep the cutting insert radially secured. Thus, the fastening member may be chosen and dimensioned such that it holds the cutting insert when the tool is not in use, but it must not be configured to resist the cutting forces. Therefore, in the tool according to the invention, the cutting inserts may be mounted at a larger negative radial rake angle, or radial tipping-in angle, which brings advantages in the form of smooth machining for acute entering angles. In tools where the cutting inserts are conventionally screw-mounted, large negative radial rake angles are very demanding for the screws, which have to withstand larger cutting forces as a result of the negative rake angle. In the tool according to the invention, the top support member, the cutting insert and the second locking member comprised in the insert seat interact to withstand the cutting forces.

The cutting inserts used in the tool according to the invention may be cutting inserts with a polygonal basic shape, such as cutting inserts which are indexable with a plurality of index positions, each index position comprising a primary cutting edge portion. The cutting inserts used may also be round, in which case indexing may be achieved by forming a plurality of differently oriented first locking members in the lower side of the cutting inserts. It is also possible to use double-sided cutting inserts, having an upper side which is identical to the lower side. The tool according to the invention is thus very versatile and may easily be adapted for different entering angles, cutting depths, cutting speeds, etc.

According to one embodiment of this first aspect of the invention, said lower contact region is provided in an area located inside of the central axis of the cutting insert. This enables the fastening member to lever the cutting insert such that it is pressed both against the top support member and the second locking member.

According to one embodiment, said upper contact region is provided in an area located outside of the lower contact region. This ensures that a pressure exerted on the lower contact region by the fastening member subjects the cutting insert to a torque.

According to one embodiment, the second locking member provided in the insert seat is in the form of a locking groove or a locking ridge.

In the case when the first locking member is in the form of a locking groove, it is preferable to provide the insert seat with a second locking member in the form of a locking ridge and vice versa. In this way, an elongated contact interface can be achieved which increases the stability of the cutting insert in the tool.

According to one embodiment, the tool is configured so that the contact interface between the top support member and the upper contact region is in the form of a line contact. By arranging the contact interface as a line contact, an overdetermined system is prevented and a secure and precise positioning of the cutting insert can be achieved. An interface in the form of a line contact can be achieved by arranging the top support member and the upper contact region as non-parallel planar surfaces that will contact each other along a line, or by making at least one of the surfaces convexly rounded.

According to one embodiment, the top support member is in the form of an elongated ridge protruding from a front surface of the insert seat facing the upper side of the cutting insert. The top support member is in this case clearly defined, leaving a clearance between the remainder of the front surface of the insert seat and the cutting insert. Furthermore, the elongated shape of the top support member makes it possible to achieve an elongated contact interface between the upper contact region and the top support member.

According to one embodiment, an empty space is provided in the tool body radially inside of the cutting insert and in connection with the insert seat, so that a clearance is provided between the tool body and a portion of the side surface located opposite of the active portion of the cutting edge. This simplifies the mounting procedure of the cutting insert since the cutting insert is easy to slide into its position resting on the axial contact surface, due to the gap formed between the side surface of the milling insert and the tool body. Preferably, the only part of the side surface of the cutting insert being in contact with the tool body is the axial support region.

According to one embodiment, the tool is configured as a milling tool, preferably a face milling tool. Such a milling tool or face milling tool may be configured according to any of the embodiments discussed above. Advantages of such a milling tool and advantageous features thereof appear from the above description. However, the tool according to the invention may also be configured as a drilling tool or as a turning tool.

According to one embodiment, the tool comprises at least two cutting inserts, of which at least one is a surface generating cutting insert further comprising a surface generating cutting edge portion, and the tool comprises a positioning device for adjusting the position of said surface generating cutting insert within the insert seat along the second locking member. Such a surface generating cutting edge portion may be in the form of a parallel land or a convex so called wiper cutting edge. In this case, the tool is particularly useful for generating smooth surfaces. By means of the positioning device, it is possible to adjust the position of one or more cutting inserts comprising a surface generating cutting edge, so that the surface generating cutting edge portion or portions protrude from the tool body with an adjustable distance with respect to neighbouring cutting inserts.

According to one embodiment, the positioning device is in the form of a screw extending at a right angle to the axial contact surface through a threaded through-hole provided in the tool body axially above the surface generating cutting insert, so that the screw upon tightening presses against the axial support region of the surface generating cutting insert. This provides an accurate way of positioning the surface generating cutting insert in the insert seat.

According to a second aspect of the invention, the above mentioned object is achieved by means of a cutting insert according to claim 11. The cutting insert comprises an upper side defining an upper extension plane and including a chip surface, wherein the upper side has the basic shape of a regular polygon, a lower side defining a lower extension plane parallel with the upper extension plane, wherein a central axis extends between the upper side and the lower side, a side surface extending between the upper side and the lower side around the periphery of the cutting insert and including a plurality of primary clearance surfaces and secondary clearance surfaces, a cutting edge comprising a plurality of primary cutting edge portions, each formed between one of the primary clearance surfaces and the chip surface, and a plurality of secondary cutting edge portions, each formed between one of the secondary clearance surfaces and the chip surface, and a plurality of locking grooves formed in the lower side, each extending inside of one of the primary clearance surfaces and outside of the central axis. The cutting insert is characterized in that each locking groove extends through the side surface at least at one of the primary clearance surfaces neighbouring the primary clearance surface inside which the locking groove extends, that the lower side further comprises a lower contact region formed to bear on a fastening member, and that the upper side comprises an upper contact region adapted to bear on a top support member of a tool body in which the cutting insert is mountable.

The cutting insert according to the invention is suitable for use in a milling tool as described above, in particular for a face milling tool, in which each insert seat comprises a second locking member in the form of a locking ridge formed to engage with a locking groove of the cutting insert. In each index position, only one of the locking grooves are active and the insert seat of the tool therefore does not need to comprise more than one locking ridge. In general, it is enough to provide as many locking grooves as there are usable primary cutting edge portions. Hence, a cutting insert with six primary and secondary cutting edge portions will have six locking grooves. The locking grooves of the cutting insert may be used both for radial locking of the cutting insert in the tool body and for positioning the cutting insert in a correct index position. The cutting insert according to the invention can therefore be very accurately positioned. Since each locking groove extends through (i.e. opens in or mouths in) the side surface at least at one of the primary clearance surfaces neighbouring the primary clearance surface inside which the locking groove extends, the cutting insert can be easily mounted in the insert seat by sliding it into its position behind the top support member of the tool body. The locking ridge is hereby used for guiding the cutting insert into its position. The lower contact region and the upper contact region may for example be in the form of flat surfaces extending in parallel with the upper and lower extension planes.

The cutting insert according to the invention is formed to be mountable in a tool body without the use of a screw or other fastening member extending through the cutting insert. The cutting insert may therefore, as discussed above in connection with the tool, be manufactured without throughhole for receiving a fastening member. The cutting insert according to the invention is therefore relatively stable and can be made thin without compromising strength, i.e. the distance between the upper side and the lower side can be made short.

The locking groove should be large enough so that it can provide the necessary radial support for the cutting insert, since the cutting insert according to the invention is formed to be fully radially supported in the tool body without using the side surface as a radial support surface. This makes it possible to manufacture the tool body such that an empty space or gap is provided inside of the cutting insert, which makes the cutting insert easy to mount by sliding it axially into the tool body.

Each locking groove preferably extends in parallel or essentially in parallel to the primary cutting edge portion formed between the primary clearance surface inside which the locking groove extends and the chip surface, or at an angle less than 25° with respect to the same. In this way, the active locking groove extends essentially along an active primary cutting edge portion and will take up the forces from this cutting edge portion. Thereby, the locking groove provides radial support while at the same time assisting in precisely positioning the active primary cutting edge portion in the insert seat. The essentially parallel extension of the locking groove is also useful in the mounting process, when the cutting insert is slid into its position guided by the locking groove, until one of its primary clearance surfaces, acting as an axial support region, abuts an axial contact surface provided in the insert seat.

According to one embodiment, each locking groove extends at an angle $\varphi$ within a range $10°\leq\varphi\leq20°$ with respect to the primary cutting edge portion formed between the primary clearance surface inside which the locking groove extends and the chip surface. Since the locking groove extends at an angle with respect to the primary cutting edge portion, its length may be increased in comparison with a locking groove extending in parallel with the cutting edge portion. In this way, the contact interface between the cutting insert and the second locking member is prolonged and the stability of the tool is improved.

According to one embodiment, the cutting insert comprises a plurality of secondary clearance surfaces and a plurality of secondary cutting edge portions, each formed between one of the secondary clearance surfaces and the chip surface, wherein each secondary cutting edge portion is configured as a surface generating cutting edge portion active together with a neighbouring primary cutting edge portion located rotationally behind the secondary cutting edge portion. The secondary cutting edge portion can in this embodiment be in the form of a parallel land or wiper cutting edge. The cutting insert is in this embodiment suitable for generating smooth surfaces.

According to one embodiment, each locking groove extends through the side surface at least at the primary clearance surface located rotationally behind the primary clearance surface inside which the locking groove extends. Thus, the locking groove extends through side surface at the primary clearance surface which is not at the side of the secondary cutting edge portion. The cutting insert may thereby be easily mounted by sliding it into its position in the insert seat.

According to one embodiment, each locking groove ends in a neighboring locking groove. This increases the contact area between the cutting insert and a locking ridge provided in the tool body, since an outer wall of the locking groove is intact and unaffected by the neighbouring locking groove. The strength of the cutting insert is thereby increased. The cutting insert is in this embodiment preferably produced by a powder metallurgy process, such as by pressing or injection moulding.

According to one embodiment, each locking groove extends through both of the side surfaces at the primary clearance surfaces neighbouring the primary clearance surface inside which the locking groove extends so that neighbouring locking grooves intersect each other. In this embodiment, the locking grooves may be produced by means of grinding.

According to one embodiment, each locking groove is formed with an innermost wall and an outermost wall, which innermost wall and outermost wall form an angle θ within the range 50°-100°, preferably within the range 60°-90°, more preferably within the rage 60°-80°, as seen in a cross section taken transversely to the locking groove. By forming the locking groove such that the walls form an angle θ within such a range, an efficient locking mechanism can be achieved, locking the cutting insert in a radial direction of the tool body as well as providing bottom support to the cutting insert. The locking groove may be symmetric or asymmetric with respect to a transverse plane taken parallel with the central axis C2 and along the length of the locking groove. In a preferred embodiment, the locking groove is symmetric.

According to an embodiment, each locking groove has a depth d within the range 0.3 w≤d≤0.7 w, wherein w is a width of the locking groove. Sufficient radial support may thereby be provided. A too deep locking groove may weaken the cutting insert, and is also more difficult to produce using pressing techniques.

According to one embodiment, the cutting insert comprises at least six primary cutting edge portions. With such a relatively large number of primary cutting edge portions, or index positions, the tool life of the cutting insert is increased in comparison with cutting inserts comprising fewer index positions. The cutting insert according to the invention may comprise up to 20 primary cutting edge portions.

Further advantages and advantageous features of the invention will appear from the following detailed description.

BRIEF DESCRIPTION OF THE DRAWINGS

The invention will in the following be described in detail with reference to the appended drawings. In the drawings.

DETAILED DESCRIPTION OF EMBODIMENTS OF THE INVENTION

Figure 1:
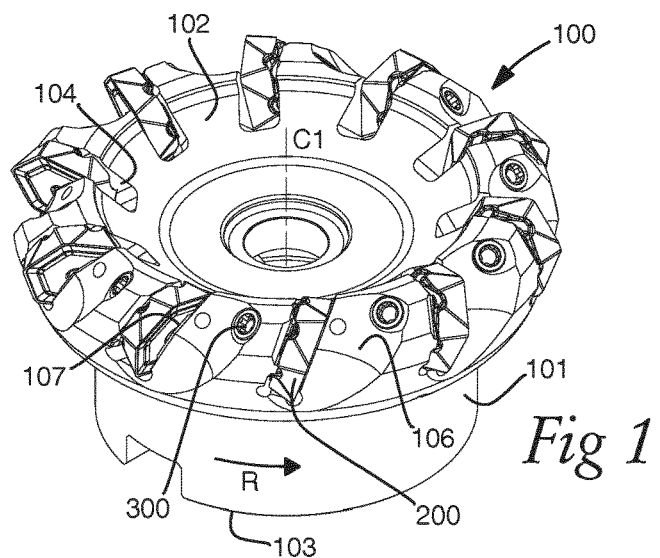
FIG. 1 shows a perspective view of a cutting tool according to the invention.
Figure 2:
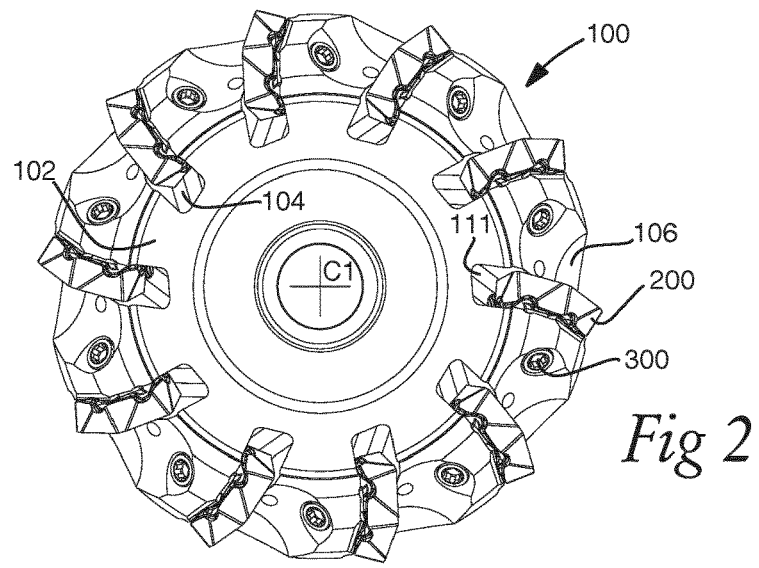
FIG. 2 shows a top view of the cutting tool in FIG. 1.
Figure 3:
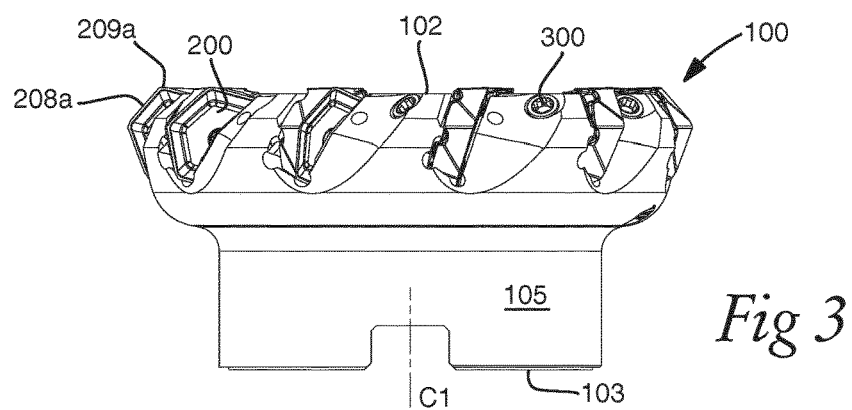
FIG. 3 shows a side view of the cutting tool in FIG. 1.
Figure 4:
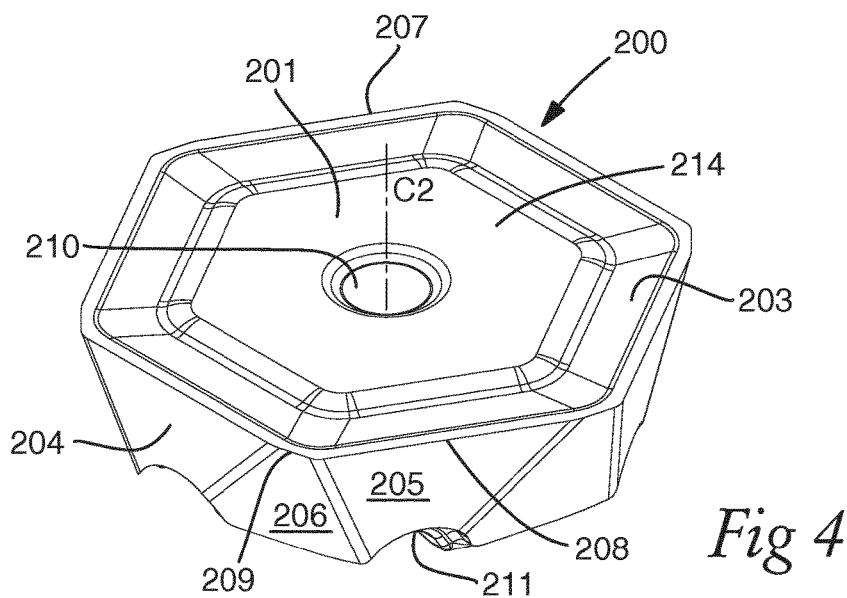
FIG. 4 shows a perspective view of a cutting insert according to the invention.
Figure 5:
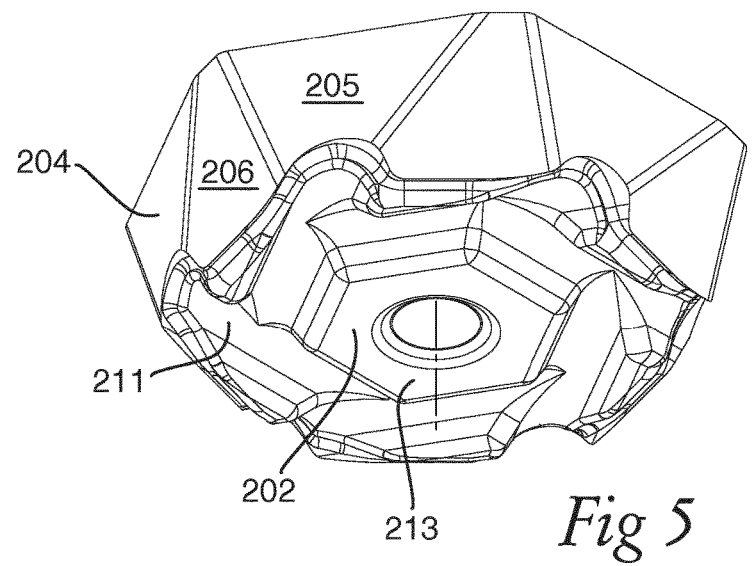
FIG. 5 shows a perspective view of the cutting insert in FIG. 4.
Figure 6:
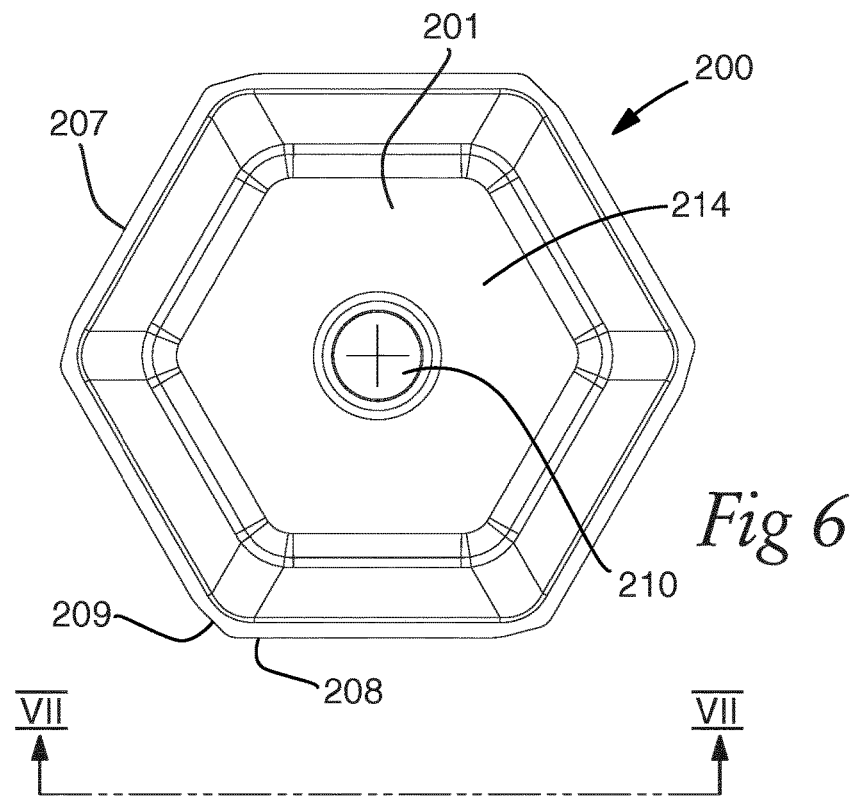
FIG. 6 shows a top view of the cutting insert in FIG. 4.
Figure 7:
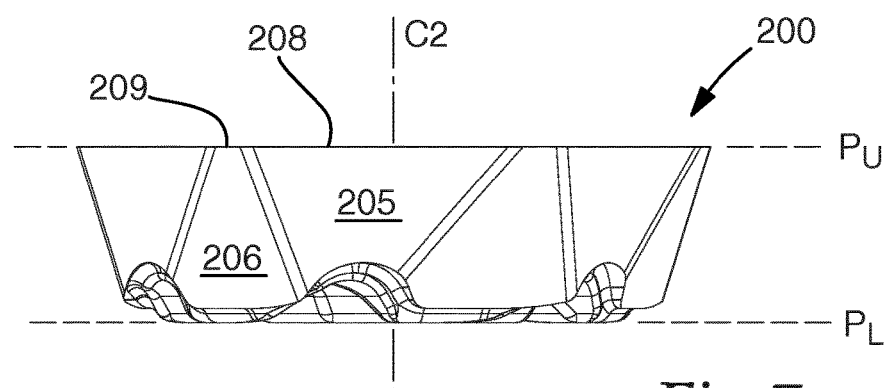
FIG. 7 shows a side view of the cutting insert in FIG. 4.
Figure 8:
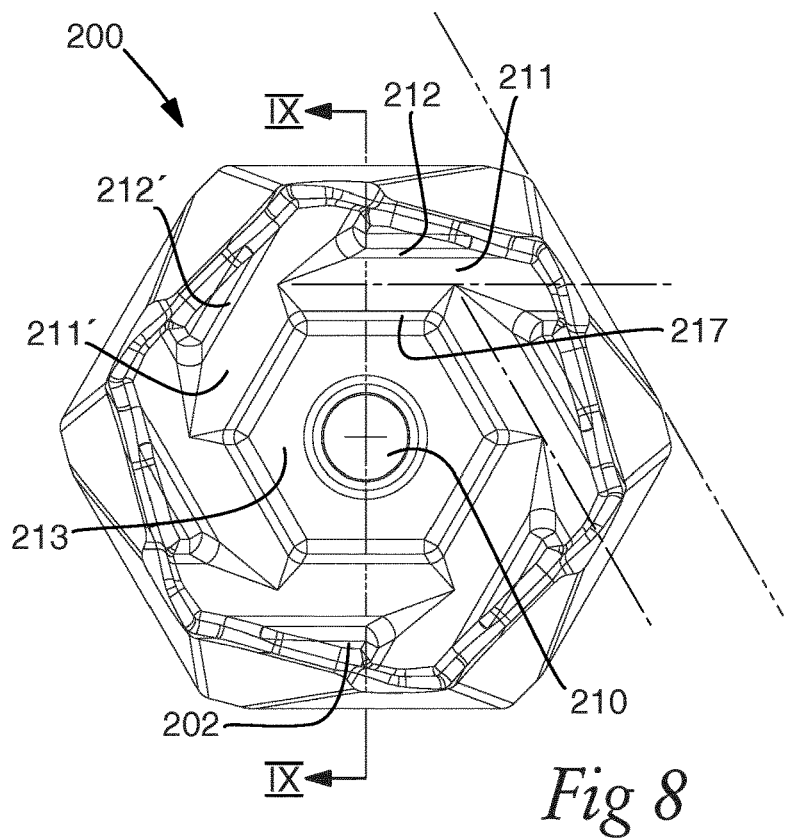
FIG. 8 shows a bottom view of the cutting insert in FIG. 4.

A face milling tool 100 according to an embodiment of the invention is shown in FIG. 1-3. The tool 100 comprises a tool body 101, ten cutting inserts 200, and ten fastening members 300. The tool body 101 has a front end 102 and a rear end 103, between which a central rotation axis C1 extends. The tool 100 is rotatable about the central rotation axis C1 in a direction of rotation R. Ten insert seats 104 are provided in the tool body 101 in a transition between the front end 102 and a peripheral surface 105 extending between the front end 102 and the rear end 103. Rotationally ahead of each insert seat 104, a chip pocket 106 and a top support member 107 for supporting the cutting insert 200 are provided. In each insert seat 104, a cutting insert 200 is securely mounted by means of clamping using a fastening member 300 in the form of a threaded screw. Radially inside of the cutting insert 200 and in connection with the insert seat 104, an empty space 111 is provided in the tool body 101.

A cutting insert 200 according to an embodiment of the invention is shown in greater detail in FIG. 4-9. The cutting insert 200 is single-sided with six index positions and comprises an upper side 201 defining an upper extension plane $P_U$ and a lower side 202 defining a lower extension plane $P_L$ parallel with the upper extension plane $P_U$. A central axis C2 extends between the upper side 201 and the lower side 202. A centre hole 210, centred on the central axis C2, also extends between the upper side 201 and the lower side 202. The upper side 201 has the basic shape of a regular polygon, in the shown embodiment a hexagon, and includes a chip surface 203.

A side surface 204 extends between the upper side 201 and the lower side 202 around the periphery of the cutting insert 200 and includes six primary clearance surfaces 205 and secondary clearance surfaces 206. A cutting edge 207 is formed between the chip surface 203 and the side surface 204, comprising six primary cutting edge portions 208, each formed between one of the primary clearance surfaces 205 and the chip surface 203, and six secondary cutting edge portions 209 in the form of parallel lands or wiper cutting edges, each formed between one of the secondary clearance surfaces 206 and the chip surface 203. In each index position, one of the primary cutting edge portions 208 is active and one of the primary clearance surfaces 205 forms an axial support region contacting an axial contact surface 109 provided in the insert seat 104 of the tool body 101.

Figure 9:
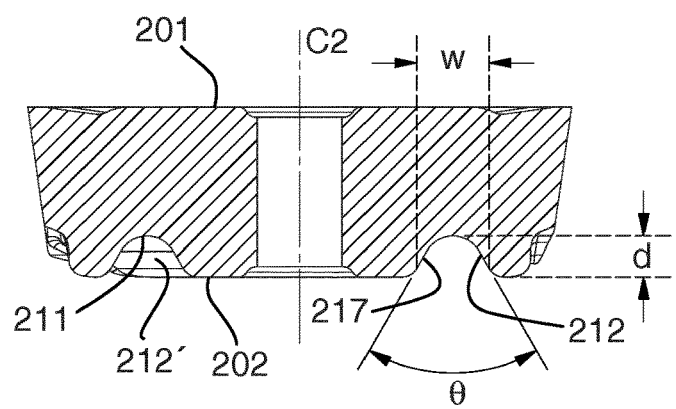
FIG. 9 shows a cross section taken along the line IX-IX in FIG. 8.

The lower side 202 of the cutting insert 200 comprises six first locking members in the form of locking grooves 211, formed to be active one at a time. Each locking groove 211 is therefore associated with an index position of the cutting insert 200 and extends inside of a first one of the primary clearance surfaces 205 and outside of the central axis C2 of the cutting insert 200. Each locking groove 211 further extends through one of the primary clearance surfaces 205 neighbouring the first primary clearance surface 205 and has an outermost wall 212 and an innermost wall 217 formed at an angle θ with respect to each other. This can be seen in FIG. 9, showing a cross section taken parallel with the central axis C1. Since the locking groove 211 only extends through one of the neighbouring primary clearance surfaces 205, the outermost wall 212' of the neighbouring locking groove 211' is in this view seen behind the locking groove 211.

The lower side 202 further comprises a lower contact region 213 formed to bear on the fastening member 300. In the shown embodiment, the lower contact region 213 is in the form of a flat surface extending around the centre hole 210 of the cutting insert 200. The upper side 201 comprises an upper contact region 214 adapted to bear on the top support member 107 of the tool body 101. Also the upper contact region 214 is in the shown embodiment in the form of a flat surface extending around the centre hole 210 of the cutting insert 200.

Figure 10:
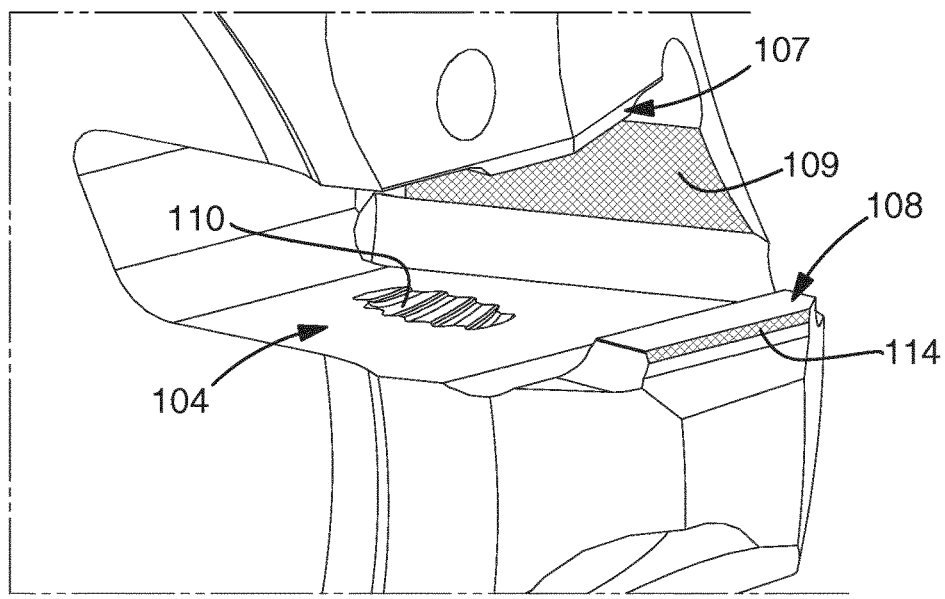
FIG. 10 shows an insert seat of the tool in FIG. 1.
Figure 11:
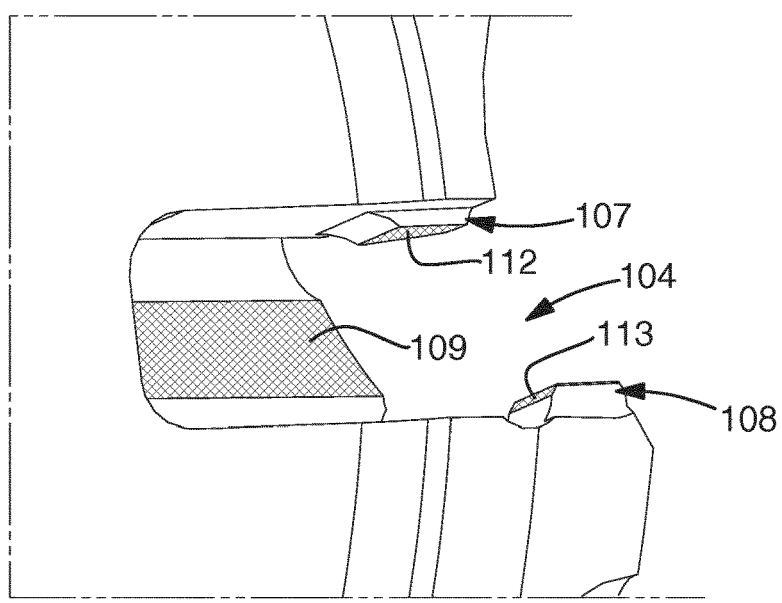
FIG. 11 shows an insert seat of the tool in FIG. 1.
Figure 12:
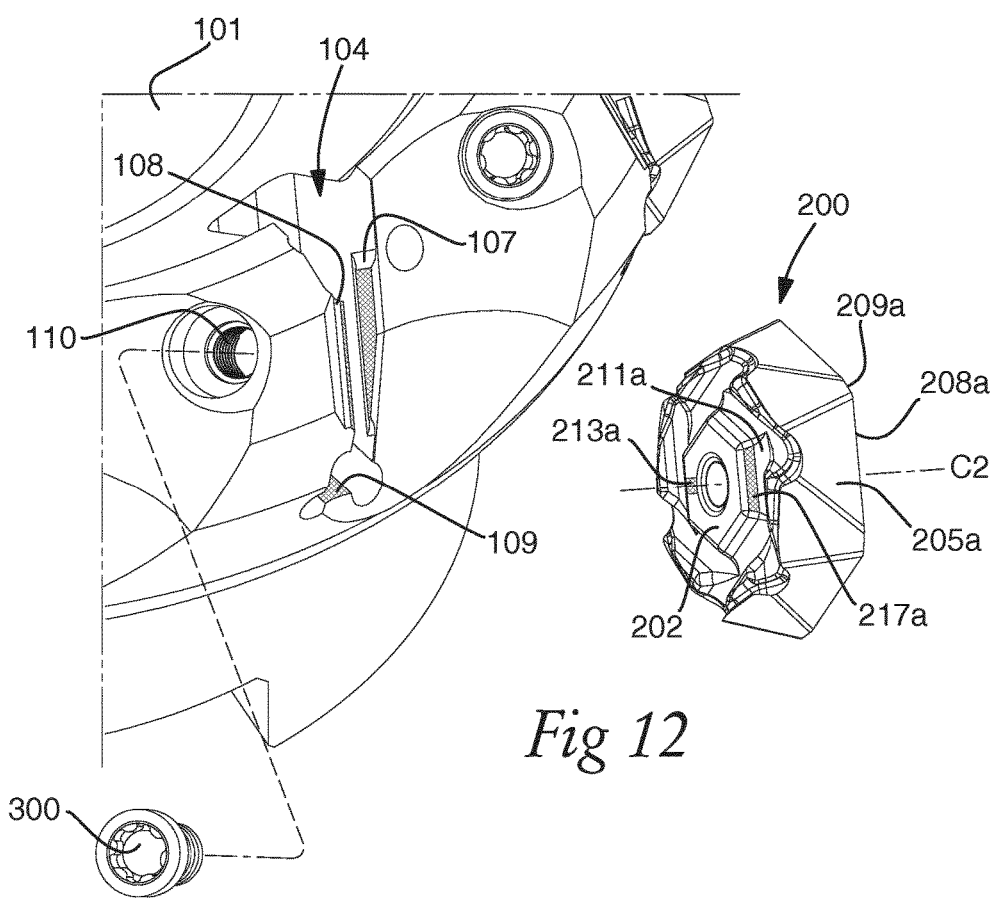
FIG. 12 shows an exploded view of part of the tool in FIG. 1.
Figure 13:
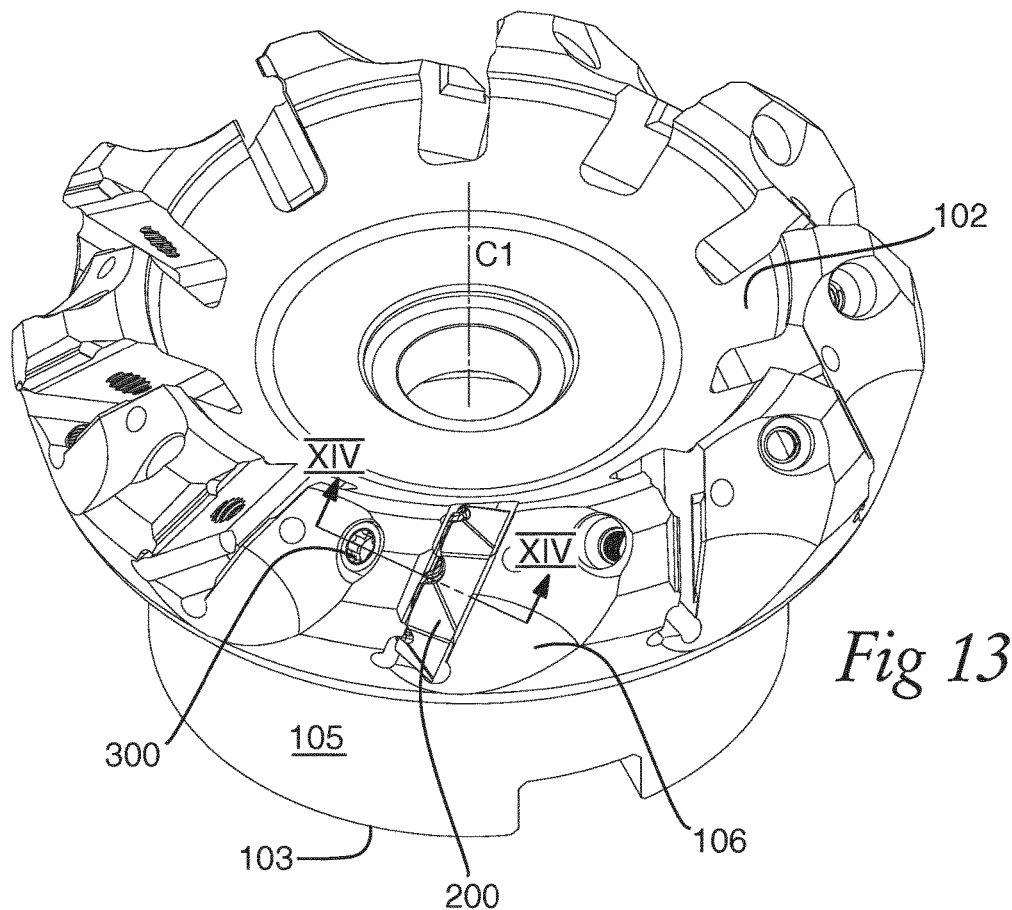
FIG. 13 shows a perspective view of the tool in FIG. 1.

Reference is now made to FIG. 10-11, showing the insert seat 104 of the tool body 101 in greater detail. The insert seat 104 comprises a second locking member in the form of a locking ridge 108, with an inner contact surface 113 and an outer contact surface 114. The locking ridge 108 is formed to engage with one of the locking grooves 211 of the cutting insert 200 and form a radial support for the cutting insert 200. Its inner contact surface 113 is configured to contact with the innermost wall 217 and its outer contact surface 114 is configured to contact with the outermost wall 212. The locking ridge 108 is situated opposite to the top support member 107, rotationally behind the cutting insert 200. The top support member 107 is formed to contact the upper contact region 214 of the cutting insert 200 with a contact surface 112, which is here in the form of a flat surface.

The locking ridge 108 and the locking grooves 211 should be dimensioned to achieve an appropriate radial support and bottom support to the cutting insert. Each of the locking grooves 211 exhibits a depth d, i.e. in a direction parallel to the central axis C2 of the cutting insert, which is smaller than a width w of the locking groove 211 (see FIG. 9). The depth d of the locking groove 211 equals in this embodiment approximately half of the width w, which may be sufficient in order to provide appropriate radial support. The depth d of the locking grooves 211 is furthermore somewhat larger than a height of the locking ridge 108 to provide some clearance between the top of the locking ridge 108 and the bottom of the active locking groove 211. The locking grooves 211 should however not be made too deep, since this tends to weaken the cutting insert 200. In general it can be said that the locking groove 211 has a width w within a range of 15%-30% of the total width on the lower side 202 of the cutting insert as seen in the cross-section of FIG. 9. In the embodiment shown the locking groove width w is approximately 15% of the total width of the insert in the cross-section shown FIG. 9.

It should furthermore be noted that both the innermost wall 217 and the outermost wall 212 of the locking groove 211 are inclined (i.e. converge) toward the bottom of the locking groove 211. In this specific case, the two walls 212, 217 of the locking groove 211 are mirror-symmetric and inclined at 60° in relation to the lower extension plane $P_L$. However, the locking groove 211 may exhibit asymmetrical walls 212, 217, in which the outermost wall 212 is inclined at a larger angle than the innermost wall 217. It is the outermost wall 212 that provides the radial support for the cutting insert 200. The walls 212, 217 should also provide an appropriate bottom support to the cutting insert 100. The total angle θ measured between the outermost wall 212 and the innermost wall 217 may however preferably not exceed 100°. Hence, if the outermost wall 212 is inclined at for instance 50°, the innermost wall 217 may be inclined at 30° or more in an asymmetric form of the locking groove 211. The total angle θ can take on a value within a range of 50°-100° to provide an appropriate radial and bottom support. In a symmetric form of the locking groove 211, it is preferable if the total angle θ is within a range of 60°-90°, or more preferably within the range 60°-80°. In the shown embodiment, θ=60°. The walls 212, 217 are hereby suitably inclined in such a way as to provide optimal bottom and radial support for the cutting insert 200. Yet it should also be possible to tilt the active locking groove 211 somewhat around the locking ridge 108 when clamping/fastening the cutting insert with the fastening member 300. The innermost wall 217 and the outermost wall 212 do not need to be planar, but could be slightly rounded. In that case, it is preferable if a chord of the innermost wall and a cord of the outermost wall fulfil the angular relationships discussed above.

The locking ridge 108 of the tool 100 should be shaped to fit into the active locking groove 211. For this purpose, the locking ridge 108 could have contact surfaces 113, 114 with a similar inclination as the innermost wall 217 and the outermost wall 212, but may also have walls with a different inclination and shape, as long as the locking ridge 108 fits into the locking groove 211 and can provide the necessary support. A clearance should be provided at the bottom of the active locking groove 211, which means that the locking ridge 108 should be dimensioned to provide such a clearance.

Figure 14:
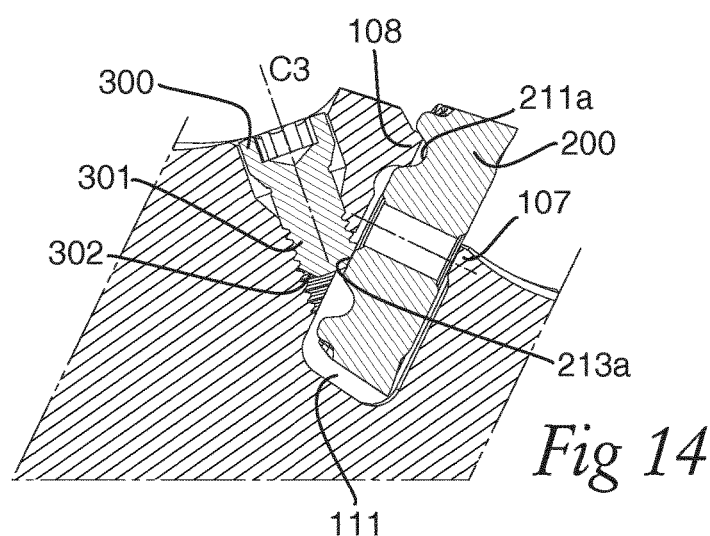
FIG. 14 shows a cross section taken along the line XIV-XIV in FIG. 13.
Figure 15:
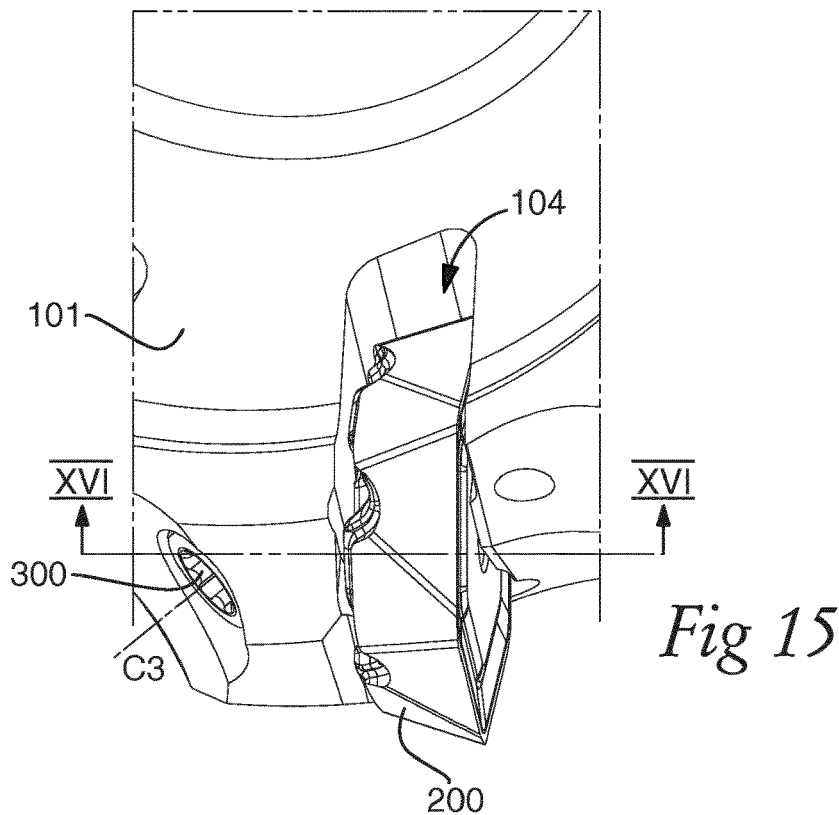
FIG. 15 shows part of the tool in FIG. 1.

A threaded through-hole 110 having an orifice in the insert seat 104 and with a central axis C3 (see FIG. 14) is provided in the tool body 101, rotationally behind the insert seat 104. In the shown embodiment, the through-hole 110 is formed so that its central axis C3 is formed at an angle with respect to a radial plane of the tool body 101, i.e. a plane perpendicular to the central rotation axis C1 of the tool body 101. The through-hole 110 is also radially tilted, i.e. tilted with respect to a radius of the tool body 101. The angle with which the through-hole is radially tilted may vary depending on the diameter of the tool body 101 and the number of insert seats 104.

FIG. 12-16 show the fastening mechanism for fastening the cutting insert 200 in the tool body 101 in more detail. In the shown embodiment, the cutting insert 200 is mounted in an index position with an active primary cutting edge portion 208a and an active secondary cutting edge portion 209a. An active locking groove 211a extends essentially in parallel with the active primary cutting edge portion 208a. A fastening member 300 in the form of a screw having a threaded portion 301 and a truncated conical end portion 302 extends through the through-hole 110 and bears on the active lower contact region 213a of the cutting insert 200, formed inside of the central axis C2 of the cutting insert 200 as can be clearly seen in FIG. 14. The fastening member 300 thereby forces the cutting insert 200 to turn/tilt into a secure position in the insert seat 104, in which an active upper contact region 214a of the cutting insert 200 is pressed against the contact surface 112 of the top support member 107 and in which the locking ridge 108 locks with the active locking groove 211a. The locking is achieved by contacting the innermost wall 217a of the locking groove 211a with the inner contact surface 113 of the locking ridge 108 and the outermost wall 212a of the locking groove 211a with the outer contact surface 114 of the locking ridge 108. The locking ridge 108 thereby forms a radial support for the cutting insert 200. Due to the empty space 111 provided inside of the milling insert 200, the locking ridge 108 is the only radial support provided. The locking ridge 108 and the locking grooves 211 should therefore be dimensioned so that an appropriate radial support is achieved. The fastening member 300 also presses a primary clearance surface 205c, acting as the active axial support region in this index position, against the axial contact surface 109 provided in the insert seat 104 of the tool body 101 so that the cutting insert 200 is secured in the axial direction of the tool 100.

Figure 17:
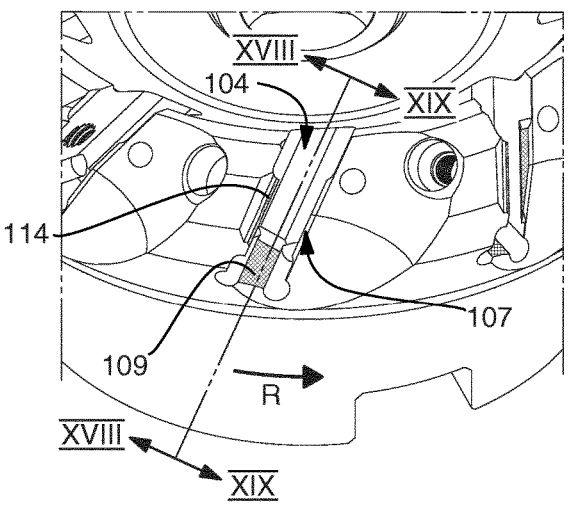
FIG. 17 shows part of the tool in FIG. 1.
Figure 18:
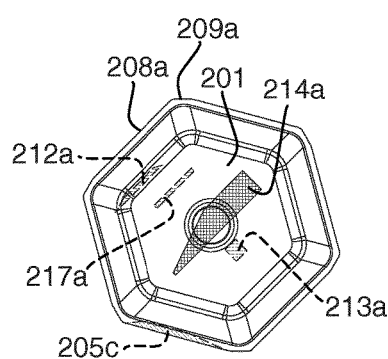
FIG. 18 shows a cross section taken along the line XVIII in FIG. 17 together with a cutting insert.
Figure 18:
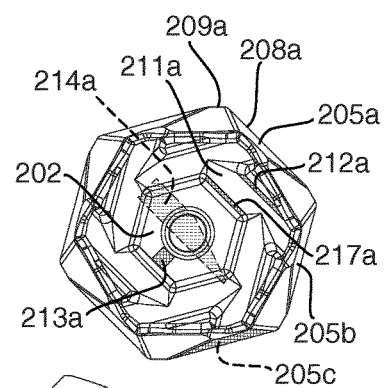
Figure 18:
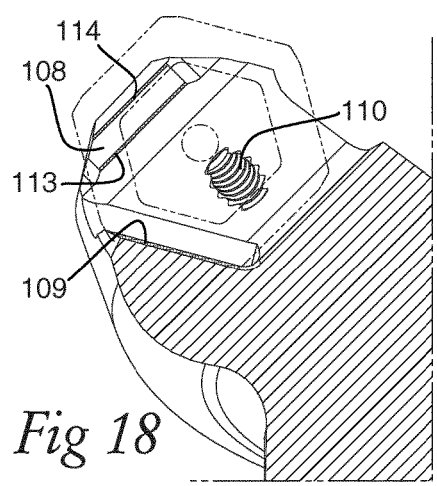
Figure 19:
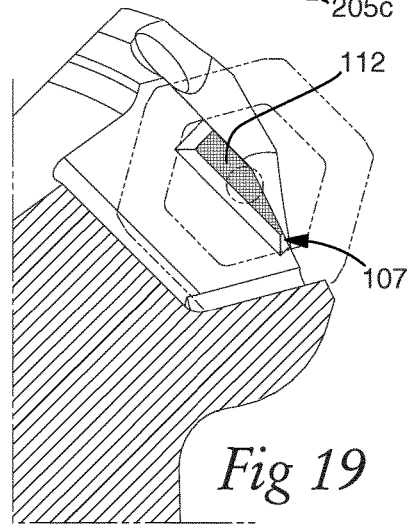
FIG. 19 shows a cross section taken along the line XIX in FIG. 17 together with a cutting insert.

FIG. 17-19 show the contact surfaces of the cutting insert 200 and the tool body 101 in detail. In FIG. 18, the insert seat 104 facing the lower side 202 of the cutting insert 200 and including the locking ridge 108 is shown together with the upper side 201 of the cutting insert 200. In FIG. 19, the top support member 107 facing the upper side 201 of the cutting insert 200 is shown together with the lower side 202 of the cutting insert 200. The position of the cutting insert 200 mounted with its primary cutting edge portion 208a as the active primary cutting edge portion is marked with dashed lines. On the cutting insert 200, the active upper contact region 214a is in FIG. 18 marked with a check pattern, while the active lower contact region 213a, the active innermost wall 217a and outermost wall 212a of the active locking groove 211a, and the primary clearance surface 205c, acting as the active axial support region contacting the axial contact surface 109, is marked with a dashed pattern. The opposite is true for FIG. 19. As can be seen, the active locking groove 211a extends inside of the primary clearance surface 205a, essentially in parallel with the active primary cutting edge portion 208a, and outside of the central axis C2 of the cutting insert 200. The locking groove 211a extends through the primary clearance surface 205b, which is provided between the active primary clearance surface 205a and the primary clearance surface 205c acting as the active axial support region of the cutting insert 200 in this index position. The upper contact region 214a has in the shown embodiment an irregular elongated shape. It extends essentially in parallel with the active cutting edge portion 208 in a central region of the upper side 201. The actual contact interfaces between the cutting insert 200, the fastening member 300 and the tool body 101 may of course deviate from the marked contact regions. For example, with the truncated conical end portion 302 of the fastening member and the flat lower contact region 213, it is possible to achieve a contact interface in the form of a line contact.

Figure 16:
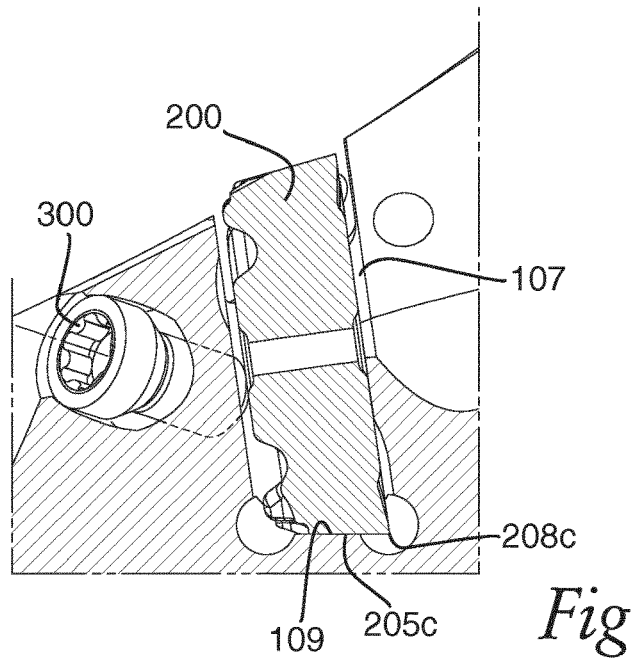
FIG. 16 shows a cross section taken along the line XIV-XIV in FIG. 15.

The empty space 111 provided radially inside of the cutting insert 200 is dimensioned such that the inactive primary clearance surfaces 205 of the cutting insert 200, and in particular the inactive primary cutting edge portions 208, are not in contact with the tool body 101. The only part of the side surface 204 that is in contact with the tool body 101 is the primary clearance surface 205c acting as the active axial support region. The primary cutting edge portion 208c associated with this primary clearance surface 205c is not in contact with the tool body 201, as seen in FIG. 16.

In order to secure a cutting insert 200 in the tool body 101, the cutting insert 200 is slid into the insert seat 104, with the active locking groove 211a engaging with the locking ridge 108, whereby the primary clearance surface 205c (the active axial support region) comes into contact with the axial contact surface 109. In order to secure the cutting insert in the insert seat 104, the fastening member 300 is screwed into the through-hole 110 such that the truncated conical surface of the end portion 302 comes into contact with the active lower contact region 213a of the cutting insert 200. In the shown embodiment, the truncated conical surface of the end portion 302 will contact the active lower contact region 213a along a line, i.e. the contact interface is in the form of a line contact. Preferably, the milling tool 200 should be configured such that an angle between the central axis C3 of the fastening member 300 and the line contact is in an interval between 50° and 75°.

During a milling operation using the milling tool 100, the cutting forces act to further press the cutting insert 200 into the insert seat 104. The fastening member 300 therefore does not need to be dimensioned to resist the cutting forces, but only to hold the cutting insert 200 in place when the milling tool 100 is in rest.

The centre hole 210 provided in the cutting inserts in the shown embodiment is not necessary for the invention and may as well be omitted. The centre hole is intended to support the insert in a PVD-coating process and is not needed to secure the cutting inserts in the tool body. The hole may therefore be excluded or made with a smaller diameter, depending on the manufacturing process. A cutting insert according to the invention and a cutting insert used in a tool according to the invention may thus be provided without centre hole.

The invention is not limited to the embodiments disclosed but may be varied and modified within the scope of the appended claims. For instance, the cutting inserts described herein are single-sided and have a positive geometry. However, the tool according to the invention may be used also with negative cutting inserts, e.g. as in the case with double-sided cutting inserts.

The upper contact region of the cutting insert and the top support member of the tool body may have different configurations, as long as a stable support is formed, preferably in the form of a line contact between the top support member and the upper contact region. Line contact is desired to achieve an initial predetermined contact line between the top support member of the tool body and the upper contact region of the cutting insert. However, due to the elasticity of the tool body, which is typically made of steel, it will in fact yield a surface contact between the top support member and the upper contact region when the contact region is pushed up against the support member with increased force.

It is not necessary that the fastening member is in the form of a screw. It may also be e.g. a tension rod, such as a spring loaded rod, or a wedge type member, or any other suitable fastening member known in the art.

LIST OF REFERENCE SIGNS 100 milling tool
101 tool body
102 front end
103 rear end
104 insert seat
105 peripheral surface
106 chip pocket
107 top support member 108 locking ridge
109 axial contact surface
110 through-hole
111 empty space
112 contact surface
113 inner contact surface
114 outer contact surface
200 cutting insert
201 upper side
202 lower side
203 chip surface
204 side surface
205 primary clearance surface
206 secondary clearance surface
207 cutting edge
208 primary cutting edge portion
209 secondary cutting edge portion
210 centre hole
211 locking groove
212 outermost wall
213 lower contact region
214 upper contact region
217 innermost wall
300 fastening member
301 threaded portion
302 end portion
C1 central rotation axis of the tool
C2 central axis of the cutting insert
C3 central axis of through-hole
d depth of locking groove
w width of locking groove
R direction of rotation
$P_U$ upper extension plane
$P_L$ lower extension plane
θ angle

The invention claimed is:

1. A tool for chip removing machining comprising:
a tool body including a front end and a rear end, between which a central rotation axis extends around, the tool being rotatable in a direction of rotation, at least one insert seat provided in a transition between the front end and a peripheral surface extending between the front end and the rear end of the tool body, and a chip pocket being provided rotationally ahead of the at least one insert seat;
at least one cutting insert securely mounted in the at least one insert seat, the at least one cutting insert including an upper side and a lower side, wherein the upper side includes a chip surface and wherein a central axis extends between the upper side and the lower side, a side surface extending between the upper side and the lower side around the periphery of the cutting insert and including at least one clearance surface, a cutting edge formed between the at least one clearance surface and the chip surface and having an active cutting edge portion defined to be located outside of the central axis of the cutting insert;
a fastening member, wherein the cutting insert in its lower side includes at least one first locking member in the form of a locking groove or a locking ridge extending in an area located outside of the central axis of the cutting insert, and wherein a second locking member configured to engage with the first locking member is provided in the insert seat; and
a top support member is provided rotationally ahead of the at least one insert seat and a through-hole having an orifice in the insert seat is provided rotationally behind the insert seat, the fastening member extending through the through-hole and bearing on a lower contact region provided on the lower side of the cutting insert, whereby the fastening member on one hand presses an upper contact region provided on the upper side of the cutting insert against the top support member of the tool body so that the second locking member locks with the first locking member and forms a radial support for the cutting insert, and on the other hand presses an axial support region provided in the side surface of the cutting insert against an axial contact surface provided in the insert seat.

2. The tool according to claim 1, wherein said lower contact region is provided in an area located inside of the central axis of the cutting insert.

3. The tool according to claim 1, wherein said upper contact region is provided in an area located outside of the lower contact region.

4. The tool according to claim 1, wherein the second locking member provided in the insert seat is in the form of a locking groove or a locking ridge.

5. The tool according to claim 1, wherein the contact interface between the top support member and the upper contact region is in the form of a line contact.

6. The tool according to claim 1, wherein the top support member is in the form of an elongated ridge protruding from a front surface of the insert seat facing the upper side of the cutting insert.

7. The tool according to claim 1, wherein an empty space is provided in the tool body radially inside of the cutting insert and in connection with the insert seat so that a clearance is provided between the tool body and a portion of the side surface located opposite of the active portion of the cutting edge.

8. The tool according to claim 1, wherein the tool is configured as a milling tool.

9. The tool according to claim 8, wherein the tool includes at least two cutting inserts, of which at least one is a surface generating cutting insert further comprising a surface generating cutting edge portion.

10. The tool according to claim 9, further comprising a positioning device for adjusting the position of said surface generating cutting insert within the insert seat along the second locking member.

11. An indexable cutting insert for a milling tool, comprising:
an upper side defining an upper extension plane and including a chip surface, wherein the upper side has the basic shape of a regular polygon;
a lower side defining a lower extension plane parallel with the upper extension plane, wherein a central axis extends between the upper side and the lower side;
a side surface extending between the upper side and the lower side around a periphery of the cutting insert and including a plurality of primary clearance surfaces and secondary clearance surfaces;
a cutting edge including a plurality of primary cutting edge portions, each formed between one of the primary clearance surfaces and the chip surface, and a plurality of secondary cutting edge portions, each formed between one of the secondary clearance surfaces and the chip surface; and
a plurality of locking grooves formed in the lower side, each extending inside of one of the primary clearance surfaces and outside of the central axis, wherein each locking groove extends through the side surface at least at one of the primary clearance surfaces neighbouring the primary clearance surface inside which the locking groove extends, that the lower side further including a lower contact region formed to bear on a fastening member, the upper side including an upper contact region arranged to bear on a top support member of a tool body in which the cutting insert is mountable.

12. The cutting insert according to claim 11, wherein each locking groove extends at an angle ($\varphi$) within a range $10° \leq \varphi \leq 20°$ with respect to the primary cutting edge portion formed between the primary clearance surface inside which the locking groove extends and the chip surface.

13. The cutting insert according to claim 11, wherein the cutting insert includes a plurality of secondary clearance surfaces and a plurality of secondary cutting edge portions, each formed between one of the secondary clearance surfaces and the chip surface, wherein each secondary cutting edge portion is configured as a surface generating cutting edge portion active together with a neighbouring primary cutting edge portion located rotationally behind the secondary cutting edge portion.

14. The cutting insert according to claim 13, wherein each locking groove extends through the side surface at least at the primary clearance surface located rotationally behind the primary clearance surface inside which the locking groove extends.

15. The cutting insert according to claim 11, wherein each locking groove ends in a neighboring locking groove.

16. The cutting insert according to claim 11, wherein each locking groove extends through both of the side surfaces at the primary clearance surfaces neighbouring the primary clearance surface inside which the locking groove extends so that neighbouring locking grooves intersect each other.

17. The cutting insert according to claim 11, wherein each locking groove is formed with an innermost wall and an outermost wall, which innermost wall and outermost wall form an angle $\theta$ within the range $50°$-$100°$, as seen in a cross section taken transversely to the locking groove.

18. The cutting insert according to claim 11, wherein each locking groove has a depth d within the range $0.3\,w \leq d \leq 0.7\,w$, wherein w is a width of the locking groove.

19. The cutting insert according to claim 11, wherein the cutting insert comprises includes at least six primary cutting edge portions.

20. The tool according to claim 10, wherein the positioning device is a screw extending at a right angle to the axial contact surface through a threaded through-hole provided in the tool body axially above the surface generating cutting insert, so that the screw upon tightening presses against the axial support region of the surface generating cutting insert.

* * * * *